F. L. KIDDER.
Fifth Wheel.
No. 30,482.　　　　　　　　　　　　　　　Patented Oct. 23, 1860.
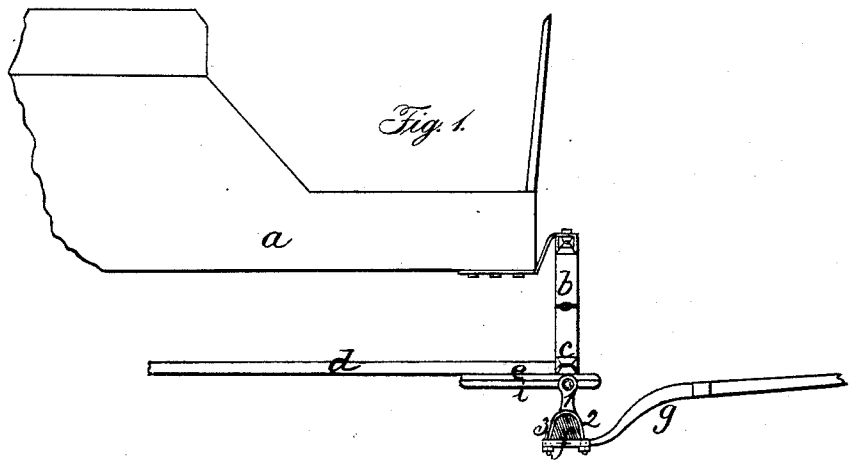
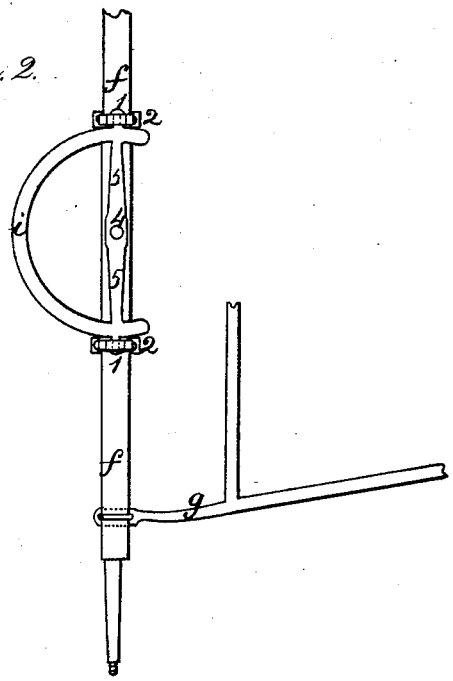
Witnesses:
Lemuel W. Serrell
Chas. H. Smith
Inventor:
Francis L. Kidder

UNITED STATES PATENT OFFICE.

FRANCIS L. KIDDER, OF BROOKLYN, NEW YORK.

RUNNING-GEAR OF VEHICLES.

Specification of Letters Patent No. 30,482, dated October 23, 1860.

*To all whom it may concern:*

Be it known that I, FRANCIS L. KIDDER, of Brooklyn, in the county of Kings and State of New York, have invented, made, and applied to use a certain new and useful Improvement in Connections for Axles and Fifth-Wheels; and I do hereby declare that the following is a full, clear, and exact description of the construction and operation of the same, reference being had to the annexed drawing, making part of this specification, wherein—

Figure 1, is a side view of my fifth wheel and axle, and Fig. 2, is a plan of the axle and lower segments of said fifth wheel.

Similar marks of reference denote the same parts

In carriages it is usual to attach the upper circle or segment of the fifth wheel to the cross head or bolster, and the lower segment directly to the axle or to a block set thereon, in all instances the axle being affixed to the said fifth wheel or the king bolt. This construction involves considerable difficulty in fitting and connecting the parts, and beside this the shafts are either permanently elevated by being affixed to the axle or else are attached thereto by a clip and bolt, so as to drop when not in use. This however is attended with wear and loosening of the said clip bolts.

The nature of my said invention consists in attaching the axle to the lower segment of the fifth wheel by clip eyes receiving gudgeons projecting from the edges of said segment, and attaching the shafts directly to said axle; thereby the separate connections of the shafts is dispensed with and the axle itself swings upon the gudgeons of the fifth wheel, so that the shafts can rise or fall; and the weight of the carriage resting directly upon the joint formed by the clip eyes prevents rattling and looseness, and the parts are less costly and more durable.

In the drawing *a*, is the body of the carriage or vehicle; *b*, is any suitable spring; *c*, is the bolster; *d*, is a perch between the bolster and hind axle that may or may not be used, according to the construction of the carriage; *e*, is the upper segment of the fifth wheel, and *i*, is the lower segment.

1, 1, are gudgeons or studs projecting from this segment *i*, taking eyes on the clips 2, 2, that are secured onto the axle *f*. *g* are the shafts secured permanently to the axle by the clips or bolts 3, 3.

It will now be evident that the lower segment *i*, is free to turn on the king bolt 4, to which it is connected by the cross piece 5, at the same time the axle swings as the shafts rise or fall, the same moving on the gudgeons 1, 1.

Having thus described my said invention, what I claim, and desire to secure by Letters Patent, is—

Connecting the axle to the lower segment of the fifth wheel by the clip eyes 2, 2, and gudgeons 1, 1, for the purposes and as specified.

In witness whereof I have hereunto set my signature this 2nd day of August 1860.

FRANCIS L. KIDDER.

Witnesses:
LEMUEL W. SERRELL,
THOS. GEO. HAROLD.